United States Patent
Lam et al.

(10) Patent No.: US 11,292,658 B2
(45) Date of Patent: Apr. 5, 2022

(54) ONE-WAY VALVE, AND TIRE REPAIR SEALANT BOTTLE HAVING SAME

(71) Applicant: Active Tools International (HK) Ltd., Hong Kong (CN)

(72) Inventors: Koon Fung Lam, Hong Kong (CN); Jianghua Yan, Hong Kong (CN)

(73) Assignee: Active Tools International (HK) Ltd., Hong Kong (CN)

( * ) Notice: Subject to any disclaimer, the term of this patent is extended or adjusted under 35 U.S.C. 154(b) by 2 days.

(21) Appl. No.: 16/758,181

(22) PCT Filed: Oct. 23, 2017

(86) PCT No.: PCT/CN2017/107303
§ 371 (c)(1),
(2) Date: Jul. 13, 2020

(87) PCT Pub. No.: WO2019/079933
PCT Pub. Date: May 2, 2019

(65) Prior Publication Data
US 2020/0346845 A1    Nov. 5, 2020

(51) Int. Cl.
*B65D 83/48*    (2006.01)
*B29C 73/02*    (2006.01)
(Continued)

(52) U.S. Cl.
CPC ............ *B65D 83/48* (2013.01); *B29C 73/025* (2013.01); *B65D 83/32* (2013.01); *B29L 2030/00* (2013.01)

(58) Field of Classification Search
CPC ...... B65D 83/48; B65D 83/32; B29C 73/025; F16K 15/021; F16K 15/025
(Continued)

(56) References Cited

U.S. PATENT DOCUMENTS 967,514 A * 8/1910 Groh ...................... F16K 15/026
                                                                137/515.5
1,275,697 A * 8/1918 Joyce ........................ F16K 1/02
                                                                137/329.01
(Continued)

*Primary Examiner* — Paul R Durand
*Assistant Examiner* — Randall A Gruby
(74) *Attorney, Agent, or Firm* — Morgan, Lewis & Bockius LLP

(57) ABSTRACT

A one-way valve (10) comprises: a valve housing (100) having a first end portion, a second end portion, a valve housing channel (110), and a stopper projection (108) provided within the valve housing channel (110); a valve body (200) having a first end portion, a second end portion, and a valve body channel (202) in fluid communication with the valve housing channel (110), the second end portion of the valve body (200) being snap-fit to the first end portion of the valve housing (100); and a sealing plug (300) slidably disposed within the valve body channel (202), wherein an inner diameter of the valve housing channel (110) is greater than an inner diameter of the valve body channel (202) and an outer diameter of the sealing plug (300), and a distance between the stopper projection (108) and the second end portion of the valve body (200) is greater than a longitudinal length of the sealing plug (300). A tire repair glue bottle (1) having a one-way valve comprises: a bottle body (20) containing glue; an air intake device (40) attached to the bottle body (20); a bottle lid (50) attached to the bottle body (20); a glue tube (30) provided within the bottle body (20) and having one end connected to the bottle lid (50); and an one-way valve (10), wherein the second end portion of the valve housing (100) of the one-way valve (10) is connected to the other end of the glue tube (30).

19 Claims, 2 Drawing Sheets

(51) Int. Cl.
*B65D 83/32* (2006.01)
*B29L 30/00* (2006.01)

(58) Field of Classification Search
USPC ............... 137/515.5, 516.25, 516.27, 528
See application file for complete search history.

(56) References Cited

U.S. PATENT DOCUMENTS

| | | | | |
|---|---|---|---|---|
| 2,223,994 | A * | 12/1940 | Johnson | F16K 15/028 |
| | | | | 137/543.21 |
| 2,339,101 | A * | 1/1944 | Parker | F16K 15/063 |
| | | | | 137/514.5 |
| 2,354,255 | A * | 7/1944 | Gillum | F16K 15/04 |
| | | | | 137/515.5 |
| 2,481,713 | A * | 9/1949 | Bertea | F16K 15/044 |
| | | | | 137/515.5 |
| 2,538,662 | A * | 1/1951 | Abbott | A61M 39/24 |
| | | | | 604/247 |
| 2,722,232 | A * | 11/1955 | Roche, Jr. | F16K 15/063 |
| | | | | 137/515.5 |
| 3,051,196 | A * | 8/1962 | Miller | F16K 15/063 |
| | | | | 137/516.29 |
| 3,122,162 | A * | 2/1964 | Sands | F16K 17/30 |
| | | | | 137/498 |
| 3,242,474 | A * | 3/1966 | Karasinski, Jr. | G01F 23/0007 |
| | | | | 222/51 |
| 3,794,077 | A * | 2/1974 | Fanshier | F16K 17/30 |
| | | | | 137/513.3 |
| 4,129,144 | A * | 12/1978 | Andersson | F16K 15/026 |
| | | | | 137/516.29 |
| 4,305,425 | A * | 12/1981 | Mackal | F16K 15/063 |
| | | | | 137/541 |
| 4,832,237 | A * | 5/1989 | Hurford, Jr. | F16L 37/0841 |
| | | | | 222/189.1 |
| 5,113,900 | A * | 5/1992 | Gilbert | F16K 15/063 |
| | | | | 137/515.5 |
| 2001/0037990 | A1 * | 11/2001 | Pous | B65D 83/38 |
| | | | | 215/272 |

* cited by examiner

ONE-WAY VALVE, AND TIRE REPAIR SEALANT BOTTLE HAVING SAME

TECHNICAL FIELD

The present disclosure relates to a one-way valve and a tire repair glue bottle having the same. The tire repair glue bottle is used together with an air compressor or the like, and is particularly suitable for repairing tires of such motor vehicles as automobiles.

BACKGROUND

At the time of repairing a tire of a vehicle, a compressed air generated by an air compressor is typically employed to press glue in a glue bottle into the tire, and then with the vehicle traveling slowly, the pressed glue is made to uniformly cover an inner wall of the tire, thus completing repair of the tire. However, since a glue tube in the glue bottle is generally a hose with a relatively small specific gravity, when the glue bottle is placed horizontally, the hose tends not to sink and cling to an inner wall of the glue bottle, thereby resulting in insufficient utilization of the glue in the bottle.

In light of the above, a solution of fabricating a glue tube from a material with a large specific gravity is proposed in the prior art. In this case, hardness of the glue tube will increase accordingly, and therefore the glue tube is unable to bend flexibly within the glue bottle, making it impossible to sufficiently use the glue at a bottom side of the bottle body.

The inventor previously proposed in CN202704235U a solution of connecting an end portion of a glue hose to a one-way valve and disposing a gravity ring around the one-way valve. Therein, the gravity ring with a large specific gravity is used, such that the glue hose may bend flexibly within the bottle body and its end always clings to an inner wall of the bottle body, to guarantee sufficient utilization of the glue within the bottle, no matter whether the tire repair glue bottle is placed horizontally or vertically. However, according to this solution, the one-way valve and the gravity ring are connected via threads, and the assembly process is rather complicated, requires much labor and can hardly be automated. The gravity ring made of metal is vulnerable to collision with the inner wall of the bottle body to make abnormal noises during traveling of the vehicle. When an end of the glue hose contacts the inner wall of the bottle body, the gravity ring, which is a cylindrical member, has its peripheral surface angled with respect to the inner wall without clinging to the inner wall, so that a large amount of glue remaining within the bottle is still not sufficiently utilized.

SUMMARY OF THE DISCLOSURE

The present disclosure is made in view of the above-mentioned problems underlying the prior art, and has an object to provide a one-way valve and a tire repair glue bottle having the same. Such a one-way valve has a simple structure and is readily mountable, and can ensure sufficient utilization of the glue within the bottle with very few glue remaining, when connected to a glue tube within the tire repair glue bottle.

According to one aspect, the present disclosure provides a one-way valve, comprising: a valve housing having a first end portion, a second end portion, a valve housing channel, and a stopper projection provided within the valve housing channel; a valve body having a first end portion, a second end portion, and a valve body channel in fluid communication with the valve housing channel, the second end portion of the valve body being snap-fit to the first end portion of the valve housing; and a sealing plug slidably disposed within the valve body channel, wherein an inner diameter of the valve housing channel is greater than an inner diameter of the valve body channel and an outer diameter of the sealing plug, and a distance between the stopper projection and the second end portion of the valve body is greater than a longitudinal length of the sealing plug.

In an embodiment, a plurality of mating recesses are provided on an inner surface of the valve housing channel, and mating projections corresponding to one or more of the plurality of mating recesses are provided on an outer surface of the second end portion of the valve body.

In an embodiment, an insertion guide slot extending from an end surface of the first end portion of the valve housing to the plurality of mating recesses is provided on the inner surface of the valve housing channel.

In an embodiment, the stopper projection is an annular projection projecting from the second end portion of the valve housing into the valve housing channel along an axial direction of the valve housing, which includes an opening penetrating a circumferential surface thereof.

In an embodiment, the stopper projection is configured to project radially on an inner surface of the valve housing channel.

In an embodiment, an outer surface of the valve body includes a tapered surface with a diameter gradually decreasing from the second end portion of the valve body toward the first end portion of the valve body.

In an embodiment, an outer surface of the valve housing or of the valve body includes a grip portion, which comprises at least partially a flat face.

In an embodiment, the valve housing is a gravity ring made of metal or plastic material, and the sealing plug is made of rubber.

In an embodiment, an anti-falling portion is provided at the first end portion of the valve body to prevent the sealing plug from disengaging from the one-way valve, and the sealing plug can move, within the valve body channel, out of the second end portion of the valve body and into the valve housing channel.

According to another aspect, the present disclosure provides a tire repair glue bottle, comprising: a bottle body containing glue; an air intake device attached to the bottle body; a bottle lid attached to the bottle body; a glue tube located within the bottle body and having one end connected to the bottle lid; and a one-way valve as described above, the second end portion of the valve housing of the one-way valve being connected to the other end of the glue tube.

In an embodiment, the valve housing of the one-way valve comprises a mouthpiece projecting outwardly from the second end portion thereof, which is connected to the glue tube by means of a spring tube clamp.

In the one-way valve of the present disclosure, the valve body is connected to the valve housing in a snap-fit or plug-fit manner, and thus only a simple translation operation is required, without having to perform a rotational operation as in the threaded engagement. The one-way valve is provided with a grip portion on an outer surface of the valve body or of the valve housing, so a robot's mechanical arm can be readily operated to perform an assembly operation of the one-way valve, contributing to large-scale automated production and reduction in labor and manufacturing costs. Moreover, in the one-way valve of the present disclosure, a stopper projection is provided within an internal channel of the valve housing, rather than on the valve body, and therefore it is unnecessary to provide additional components such as a valve cover, leading to a simple structure and low manufacturing costs. In addition, the one-way valve is also provided with a tapered surface on an outer surface of the valve body. Accordingly, the one-way valve will sink when attached to the glue tube, causing the glue tube to contact the inner wall of the bottle body of the tire repair glue bottle, and the tapered surface will cling to the inner wall of the bottle body, so that the glue at a bottom side of the bottle body enters the valve body channel to a maximum extent and is sufficiently utilized.

BRIEF DESCRIPTION OF THE DRAWINGS

Hereinafter, the present disclosure will be described in more detail in conjunction with the drawings and specific embodiments. For the sake of clarity, the drawings are not necessarily drawn proportionally, but some of them may be exaggerated to show specific details. In all the drawings, the same reference numerals denote identical or similar parts.

REFERENCE NUMERALS

Figure 1:
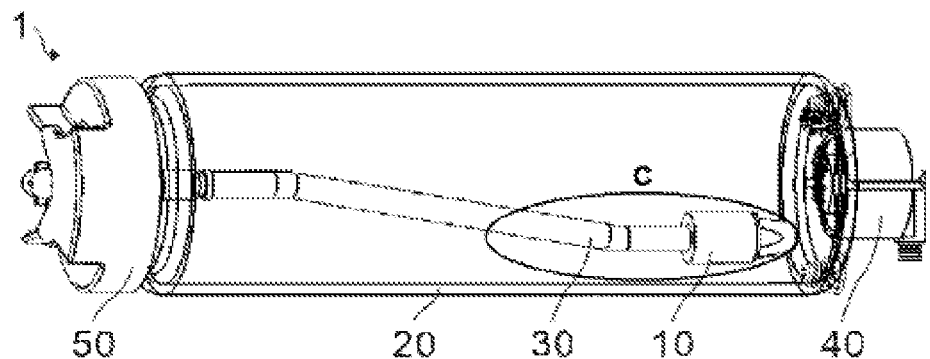
FIG. 1 is a structural view of a tire repair glue bottle according to the present disclosure.

1: Tire repair glue bottle
10: One-way valve
20: Bottle body
30: Glue tube
40: Air intake device
50: Bottle lid
100: Valve housing
102: Mouthpiece
104: Mouthpiece channel
106: Opening
108: Stopper projection
110: Valve housing channel
112: Mating recess
114: Sealing slot
116: Insertion guide slot
200: Valve body
202: Valve body channel
204: Step
206: Anti-falling portion
208: Tapered surface
210: Mating projection
212: Insertion guide surface
214: Sealing slot
216: Sealing ring
218: Grip portion
300: Sealing plug
400: Spring tube clamp.

DETAILED DESCRIPTION

Hereinafter, embodiments of the present disclosure will be described in detail with reference to the drawings. It is easily understood by those skilled in the art that, the description only lists exemplary embodiments, and is never intended to limit the protection scope of the present disclosure. For example, the features described in one drawing or embodiment may be combined with those features described in other drawings or embodiments to create a further embodiment. Additionally, in order to describe the positional relationship between components, the present disclosure uses spatial relative terms such as "upper/on/above", "lower/below", "left", "right", "front", "back", etc., but these terms are employed based on the drawings simply for the convenience of description, and do not limit specific orientation of the respective components.

With reference to the drawings, FIG. 1 is a structural view of a tire repair glue bottle 1 according to the present disclosure. As shown, the tire glue bottle 1 of the present disclosure includes a bottle body 20 containing glue and a glue tube 30 provided within the bottle body 20. A bottle lid 50 is attached to a left end portion of the bottle body 20, for opening and closing the glue bottle to facilitate filling of glue. The air intake device 40 is attached to a right end portion of the bottle body 20 for inputting compressed air into an interior of the glue bottle so as to take out glue within the bottle. An end of the glue tube 30 is connected to the bottle lid 50, and passes through an internal channel of the bottle lid 50 to direct glue within the bottle body out to a crack of the tire, for example. The other end of the glue tube 30 is connected to a one-way valve 10, which renders glue within the bottle body 20 able to flow in a right-to-left direction but unable to flow in an opposite direction.

When the tire repair glue bottle 1 of the present disclosure is used, air pressurized by an air compressor, for example, is input into the bottle body 20 through the air intake device 40. When pressure of the pressurized air rises to a certain value (e.g., 2 to 4 Bar), the one-way valve 10 will turn on, as described below, thereby allowing the glue to enter the glue tube 3 through the one-way valve and then to flow out of the glue bottle through the bottle lid 50.

Figure 2:
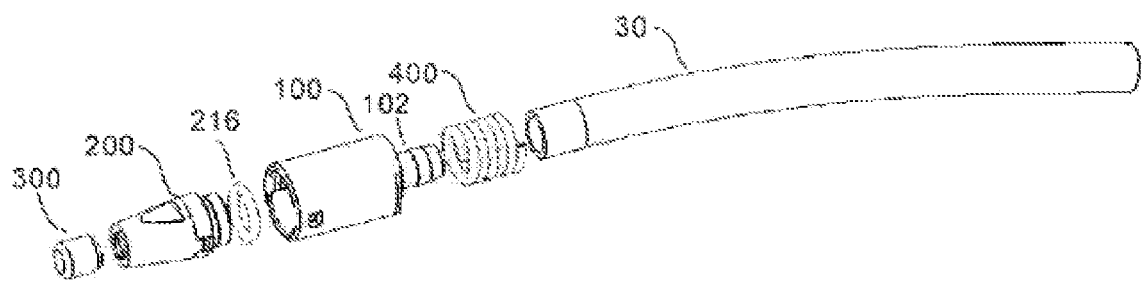
FIG. 2 is an exploded view of an assembly represented by C in FIG. 1.

FIG. 2, which is an exploded view of an assembly represented by C in FIG. 1, shows a plurality of constituent parts of the one-way valve 10 and the connection relationship between the one-way valve 10 and the glue tube 30. As shown, the one-way valve 10 includes a sealing plug 300, a valve body 200, a sealing ring 216, and a valve housing 100. Therein, the sealing plug 300 is slidably disposed within an internal channel of the valve body 200; a right end portion of the valve body 200 is inserted into and connected to a left end portion of the valve housing 100; and the sealing ring 216 is interposed between an outer surface of the right end portion of the valve body 200 and an inner surface of the left end portion of the valve housing 100, to prevent the glue flowing into the one-way valve from leaking out through a junction between the valve body 200 and the valve housing 100. The valve housing 100 is also provided with a mouthpiece 102 projecting outwardly from a right end portion thereof along an axial direction, and the mouthpiece 102 is provided, on a peripheral surface thereof, with one or more annular ribs extending along a circumferential direction. Although a straight line-shaped mouthpiece 102 is shown in FIG. 3, it is easily understood that the mouthpiece 102 may also take a shape bent into an L shape or the like.

When an assembled one-way valve 10 is connected to the glue tube 30, the mouthpiece 102 is first inserted into an internal channel at an end of the glue tube 30, and then a spring tube clamp 400 sleeves an outer side of the glue tube 30, and moves to fix an end of the glue tube 30 to the mouthpiece 102. In an embodiment, the spring tube clamp 400 is a helical spring, with an inner diameter slightly greater than an outer diameter of the glue tube 30, and with a pitch preferably corresponding to spacing between the plurality of annular ribs on the mouthpiece 102. In this case, the helical spring will expand slightly in diameter when it sleeves the peripheral surface of the glue tube 30, and will rebound when moving onto the mouthpiece 102 to engage the annular ribs of the mouthpiece via the glue tube 30.

Figure 3:
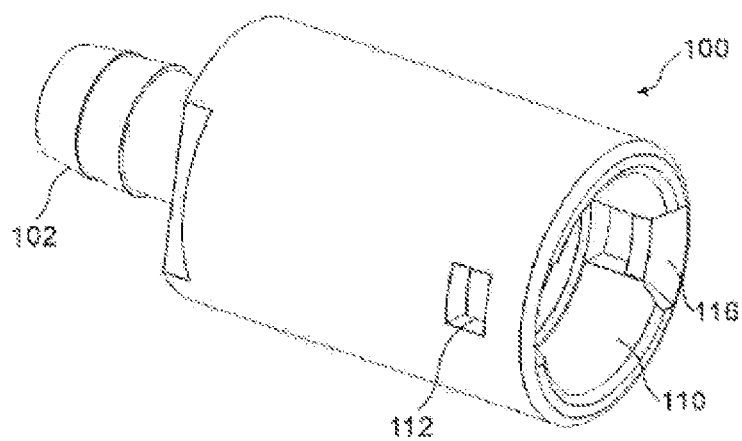
FIG. 3 is a perspective view of a valve housing of a one-way valve according to an embodiment.
Figure 4:
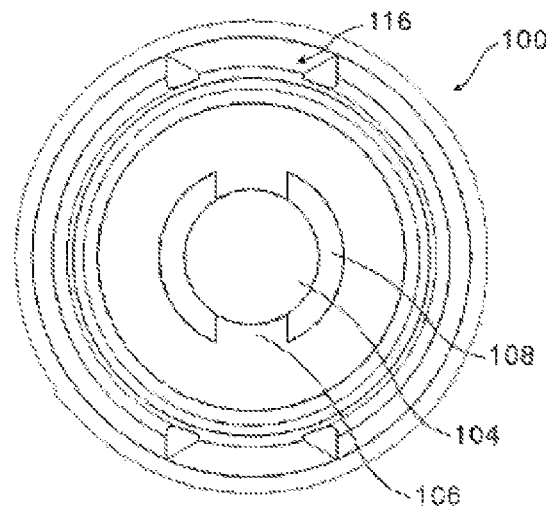
FIG. 4 is a side view of a valve housing of a one-way valve according to an embodiment.

Reference is made to FIG. 3 which is a perspective view of the valve housing 100 of the one-way valve 10, and FIG. 4 which is a side view of the valve housing 100. As shown, the valve housing 100 in a substantially cylindrical shape includes an internal valve housing channel 110 and a mouthpiece 102 projecting outwardly from an end portion along an axial direction. On a peripheral surface of the end portion of the valve housing 100 is provided with a through mating recess 112 so as to receive a mating projection 210 of a valve body 200 described below. Two or more mating recesses 112 are provided equidistantly in a circumferential direction of the valve housing 100. For example, two mating recesses 112 may be provided opposite to each other along a diameter of the valve housing 100 on the peripheral surface of the valve housing 100, or three mating recesses 112 may be provided 120° apart from each other on the peripheral surface of the valve housing 100. In an embodiment, the mating recesses 112 may not penetrate the peripheral surface of the valve housing 100, but may only be concavely provided on an inner surface of the valve housing channel 110. At this time, a depth of the mating recess 112 needs to be greater than or equal to a height of the mating projection 210 described below.

In addition, an insertion guide slot 116 may be further provided on the inner surface of the valve housing channel 110, and extends from an end surface of the valve housing 100 to the mating recess 112 so as to smoothly guide the mating projection 210 of the valve body 200 to be snap-fit to the mating recess 112 when the valve body 200 is inserted into the valve housing 100. The valve housing channel 110 may further include a tapered surface with a diameter gradually increasing toward the above-mentioned end surface to guide the valve body 200 in case the valve body 200 is initially not fully coaxial with the valve housing 100, thereby realizing alignment of the valve body 200 with the valve housing 100. In this case, it is unnecessary to strictly align the valve body 200 with the valve housing 100 during assembly of the one-way valve.

Figure 6:
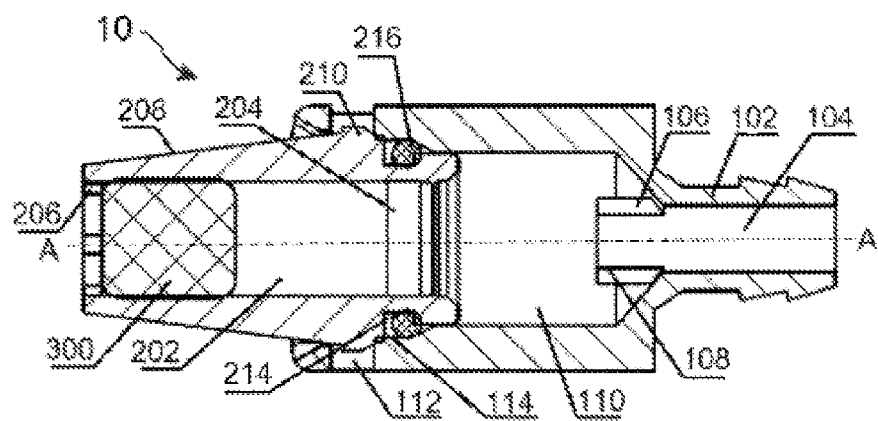
FIG. 6 is a cross-sectional view of a one-way valve according to an embodiment.

As shown in FIGS. 4 and 6, the valve housing 100 further includes a stopper projection 108 projecting into the valve housing channel 110 from an end portion at which the mouthpiece 102 is provided along an axial direction A-A of the valve housing. The stopper projection 108 shown in FIG. 6 is a substantially annular member, is provided on a peripheral surface thereof with a through opening 106, and is provided in an interior thereof with a fluid channel in communication with both the valve housing channel 110 and a mouthpiece channel 104 within the mouthpiece 102. In an embodiment, a left end portion of the annular member may be closed, so that the mouthpiece channel 104 remains in communication with the valve housing channel 110 solely via the opening 106. The opening 106 may be an elongate slit provided throughout a length of the annular projection, or may be an orifice in circular or other shape. Moreover, two or more openings 106 may be provided equidistantly along a circumferential direction of the annular projection. For example, two openings 106 may be provided opposite to each other on a peripheral surface of the annular projection along a diameter of the annular projection, or three openings 106 may be arranged 120° apart from each other on the peripheral surface of the annular projection.

FIG. 3 further illustrates an engagement notch provided adjacent to the mouthpiece 102 on an outer surface of a cylindrical body of the valve housing 100. The engagement notch is formed by cutting a juncture between the outer surface and end surface of the cylindrical body. The engagement notch may be referred to herein as a grip portion. During the assembly process of the one-way valve, a robot's mechanical arm may be used to grasp the engagement notch to prevent unintended rotation of the valve housing 100, or perform such operations as movement of the valve housing 100. FIG. 4 further shows a sealing slot 114, which is provided on the inner surface of the valve housing channel 110, rearward of the mating recess 112, and between the mating recess 112 and the stopper projection 108, for receiving a sealing ring 216 sleeving the peripheral surface of the valve body 200 during insertion of the valve body 200 into the valve housing 100.

Figure 5:
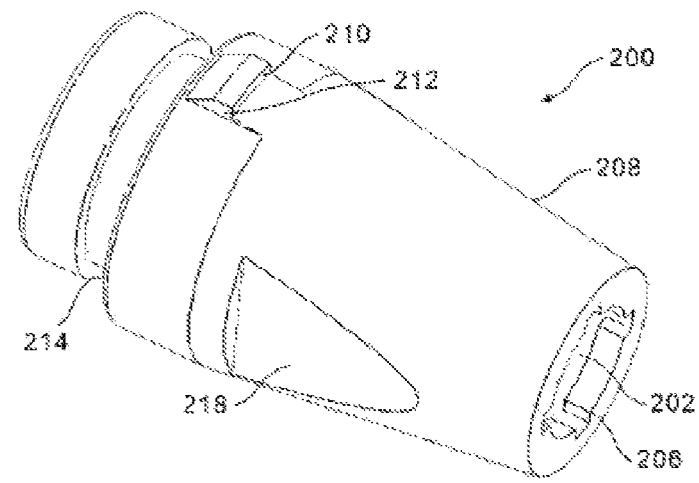
FIG. 5 is a perspective view of a valve body of a one-way valve according to an embodiment.

Turning now to FIG. 5, a perspective view of the valve body 200 of the one-way valve 10 according to the present disclosure is shown. As shown, the valve body 200 is generally cylindrical and includes an internal valve body channel 202 that is in fluid communication with the valve housing channel 110 in the assembled one-way valve 10. The valve body 200 comprises a sealing slot 214 provided concavely on a peripheral surface of one end portion along its circumferential direction, for receiving the sealing ring 216. Two or more mating projections 210 projecting outwardly in a radial direction are provided rearward of the sealing slot 214 along the circumferential direction of the valve body 200. The positions and number of such mating projections 210 correspond to those of the aforementioned mating recesses 102. In an embodiment, the number of the mating projections 210 may be smaller than the number of the mating recesses 102, and in this case, the mating projections 210 are only snap-fit to some of the mating recesses 102. In an embodiment, flat insertion guide faces parallel to each other may be provided on both sides of the mating projection 210, so as to mate with a side surface of the insertion guide slot 116 to reliably guide the insertion process when the mating projection 210 advances to the mating recess 102 of the valve housing along the insertion guide slot 116.

The valve body 200 further includes a tapered surface 208 with a diameter gradually decreasing from the mating projection 210 toward the other end portion of the valve body 200 away from the valve housing 100. An angle between the tapered surface 208 and the axial direction A-A may be selected such that the tapered surface 208 will cling to an inner wall of the bottle body 20 when the one-way valve 10 attached to the glue tube 30 sinks to contact the inner wall of the bottle body 20 of the tire repair glue bottle. In this case, when the tire repair glue bottle 1 is placed horizontally, the glue located at a bottom side of the bottle body will enter the valve body channel 202 to a maximum extent and be output to the outside of the bottle body, with very few glue remaining in the bottle body. For example, in the case where the glue tube 30 is attached to the bottle lid 50 along a central axis of the bottle body 20, a sine value of the angle may be equal to a ratio of a radius of the bottle body 20 to a length of the glue tube 30.

FIG. 5 further shows a grip portion 218 provided on an outer surface of the valve body 200, which may include at least partially a flat face. Therefore, during the assembly process of the one-way valve, the grip portion 218 or flat face may be grasped by a robot's mechanical arm to perform such operations as movement of the valve body 200, or to prevent unintended rotation of the valve body 200, which contributes to automated production and reduction in labor costs. A plurality of grip portions 218 may be provided symmetrically along the circumferential direction of the valve body 200, and may also take other forms, such as grooves extending in an up-down direction or a left-right direction, as long as it can be readily clamped tightly by the mechanical arm.

As shown, at an end portion of the valve body 200 away from the valve housing 100 side is provided with an anti-falling portion 206 which partially blocks the valve body channel 202, for preventing a sealing plug 300 from falling when the sealing plug 300 is mounted from an opposite end portion of the valve body into the valve body channel 202. Under the pressure of glue, the sealing plug 300 may move out of the valve body 200 within the valve body channel 202, and fall into the valve housing channel 110. In an embodiment, a step 204 may be provided on an inner surface of the valve body channel 202 at a side adjacent to the valve housing 100. The sealing plug 300 can slide freely between the anti-falling portion 206 and the step 204 when the pressure of glue does not rise to a predetermined value, and will move across the step 204 to fall into the valve housing channel 110 when the pressure of glue reaches the predetermined value. The glue bottle, under the impact of high temperature and/or low temperature environment where the glue bottle lies, may have air and/or glue therein expanded or contracted, thereby resulting in a change in the pressure within the bottle. A sealing device of the glue bottle in the prior art may be accordingly damaged, especially a glue bottle which uses tin foil or thin film as the sealing device. In this embodiment, the sealing plug 300 is slidable between the anti-falling portion 206 and the step 204 but remains clinging to the valve body channel 202, such that a pressure change induced by the expansion and/or contraction of the air and glue may be properly eliminated to ensure a sealed environment within the entire glue bottle.

The sealing plug 300 may be made of an elastomer material such as rubber or the like, and has a diameter equal to or slightly greater than an inner diameter of the valve body channel 202. Where the diameter of the sealing plug 300 is slightly greater than the inner diameter of the valve body passage 202, the sealing plug 300 will be located within the valve body channel 202 in a compressed state. In this case, even if the anti-falling portion 206 is not provided, the sealing plug 300 is not prone to disengage from the valve body channel 202 either. Instead, the sealing plug 300 moves away from the valve body channel 202 and falls into the valve housing channel 110 under the pressure of glue only when the compressed air is filled into the bottle body 20. At this time, the pressure change induced by the expansion and/or contraction of the air and glue within the glue bottle may also cause the sealing plug 300 to move within a certain range without disengaging from the valve body 200.

The valve body 200 or valve housing 100 may be made of any kind of material with a large specific gravity, such as metals including iron and steel, and alloys thereof, and may also be made of a material such as resin or plastic. The valve housing 100, which may also be referred to herein as a gravity ring, causes an end of the glue tube 30 to sink to the bottom side of the bottle body 20 under the action of gravity. In the case where the valve body 200 or valve housing 100 is made of resin, plastic or the like, when the glue bottle is placed in a trunk of the vehicle and the vehicle is traveling, no abnormal noises will be made even if the one-way valve collides with an inner wall of the bottle body of the glue bottle. In addition, in the case where the valve body 200 or valve housing 100 is made of metal or alloy material, a layer of elastomer material may be wrapped onto the outer surface of the valve body 200 or valve housing 100 in order to cancel the abnormal noises resulting from the collision of the one-way valve with the inner wall of the bottle body of the glue bottle. Furthermore, in an embodiment, the valve body channel 202 may include a tapered surface with a diameter gradually increasing toward a side of the valve housing 100 to facilitate installation of the sealing plug 300 therein.

With reference to FIG. 2 and FIG. 6 which is a cross-sectional view of the one-way valve 10, an assembly process of the one-way valve 10 according to the present disclosure will be explained. Firstly, the sealing plug 300 is mounted from a right end portion of the valve body 200 into the valve body channel 202, and is interposed between the anti-falling portion 206 and the step 204. Then, the sealing ring 216 is fitted from the right end portion of the valve body 200 into the sealing slot 214 on the peripheral surface. Next, one mechanical arm is used to clamp the engagement notch of the valve housing 100, and another mechanical arm is used to clamp the grip portion 218 of the valve body 200, so that the valve housing 100 and the valve body 200 move along a direction of approaching one another, and the mating projection 210 of the valve body 200 enters the mating recess 112 along the insertion guide slot 116 of the valve housing 100. Meanwhile, the sealing ring 216 is also received in the sealing slot 114 on the inner surface of the valve housing 100, and is interposed in a compressed state between the outer surface of the valve body 200 and the inner surface of the valve housing channel 110, to prevent the glue entering the valve housing channel 110 from leaking out via a gap between the valve body 200 and the valve housing 100 and via the mating recess 112. As such, the assembly of the one-way valve 10 is completed. Compared with the prior-art solution of screwing a valve body to a valve housing, the above assembly process requires only a simple translation operation without having to perform a rotational operation, so it is possible to conveniently adopt a large-scale automated production process, which contributes to reduction in labor and manufacturing costs. Thereafter, the mouthpiece 102 of the valve housing 100 may be connected to the glue tube 30 by means of the spring tube clamp 400, as described above.

The operating principles of the one-way valve 10 and the tire repair glue bottle 1 according to the present disclosure are as follows: (1) when the tire repair glue bottle is not used, the compressed air does not enter the bottle body 20 of the glue bottle, and the sealing plug 300 clings to the anti-falling portion 206 within the valve body channel 202 of the valve body 200, thereby blocking the opening of the one-way valve and preventing the glue from entering the one-way valve; (2) when it is intended to use the tire repair glue bottle, the glue bottle is mount to an air compressor, and the compressed air is input into the bottle body 20 through an air intake device 40, so that air pressure within the bottle body 20 is greater than air pressure in the interior of the glue tube 30 (e.g., an atmospheric pressure), whereby the glue flows toward the glue tube under the action of an air pressure difference to force the sealing plug 300 to depart, within the valve body channel 202 of the valve body 200, from the anti-falling portion 206 and to move to the right side of the one-way valve (see FIG. 6); (3) when the air pressure within the bottle body 20 rises to a certain value (e.g., 2 to 4 Bar), the sealing plug 300 will move across the step 204 within the valve body channel 202, and then fall into the valve housing channel 110 of the valve housing 100. In this case, the sealing plug 300 will cling to the left end surface of the stopper projection 108. The glue will flow successively through the valve body channel 202, the valve housing channel 110, the opening 106 in the stopper projection 108, and the mouthpiece channel 104, and then will be delivered to the glue tube 30 and applied to a crack of the tire through an internal channel in the bottle lid 50 for repairing the tire.

In order to ensure that the sealing plug 300 falling into the valve housing channel 110 will not block the flow path of the glue, an inner diameter of the valve housing channel 110 needs to be configured as being greater than an inner diameter of the valve body channel 202 and an outer diameter of the sealing plug 300. Moreover, a distance between the left end surface of the stopper projection 108 and the right end surface of the valve body 200 needs to be greater than a longitudinal length of the sealing plug 300, that is, a length along the axial direction A-A.

In another embodiment, the stopper projection 108 may be a projection configured to project radially on the inner surface of the valve housing channel 110, rather than the annular projection projecting from the right end portion of the valve housing 100 into the valve housing channel 110. The projections are configured to be plural, such as three or more, equidistantly on the inner surface of the valve housing channel 110 along a circumferential direction. Likewise, a distance between the projection and the right end surface of the valve body 200 is greater than a longitudinal length of the sealing plug 300, so that the sealing plug 300 is prevented from further moving along the valve housing channel 110, yet without posing a hindrance to the flow path of the glue.

In addition, other forms of stopper projections are foreseeable, so long as they are able to prevent the sealing plug 300 from blocking the flow path of the glue. For example, in an embodiment, it is feasible to provide a plurality of rod-shaped elements extending parallel to each other from the right end portion of the valve housing 100 to the left (i.e., toward the valve housing channel 110) along the axial direction A-A. These rod-shaped elements may be solid to block further movement of the sealing plug 300 along the valve housing channel 110. In another embodiment, a step may be provided on the inner surface of the valve housing channel 110. The step constitutes an inner diameter reduction portion of the valve housing channel and includes a through slot which allows for circulation of the glue. A distance between the left end surface of the step and the right end surface of the valve body is greater than the longitudinal length of the sealing plug 300.

Some embodiments have been described above in detail. However, it is understood that various changes, substitutions, and alternatives can be made herein without departing from the spirit and scope defined by the appended claims. Although one embodiment can achieve multiple objectives, not every embodiment falling within the scope of the appended claims will achieve every objective. Furthermore, the scope of the present application is not limited to the processes, machines, manufacturing, material composition, components, methods, steps, etc. described in the specification. Those skilled in the art understand that processes, machines, manufacturing, material composition, components, methods, or steps, which currently exist or that are developed later to perform substantially the same functions or achieve substantially the same results as the corresponding embodiments described herein, can be utilized according to the embodiments herein. Therefore, the appended claims are intended to contain, within the scope thereof, these processes, machines, manufacturing, material composition, components, methods, or steps.

What is claimed is:

1. A one-way valve, comprising:
   a valve housing having a first end portion, a second end portion, a valve housing channel, and a stopper projection provided within the valve housing channel;
   a valve body having a first end portion, a second end portion, and a valve body channel in fluid communication with the valve housing channel, the second end portion of the valve body being snap-fit to the first end portion of the valve housing;
   a sealing plug slidably disposed within the valve body channel; and
   a step provided on an inner surface of the valve body channel,
   wherein an inner diameter of the valve housing channel is greater than an inner diameter of the valve body channel and an outer diameter of the sealing plug, and a distance between the stopper projection and the second end portion of the valve body is greater than a longitudinal length of the sealing plug, and
   wherein the plug is configured to pass the step when a pressure reaches a predetermined value.

2. The one-way valve according to claim 1, wherein a plurality of mating recesses are provided on an inner surface of the valve housing channel, and mating projections corresponding to one or more of the plurality of mating recesses are provided on an outer surface of the second end portion of the valve body.

3. The one-way valve according to claim 2, wherein an insertion guide slot extending from an end surface of the first end portion of the valve housing to the plurality of mating recesses is provided on the inner surface of the valve housing channel.

4. The one-way valve according to claim 1, wherein the stopper projection is an annular projection projecting from the second end portion of the valve housing into the valve housing channel along an axial direction of the valve housing, which includes an opening penetrating a circumferential surface thereof.

5. The one-way valve according to claim 1, wherein the stopper projection is configured to project radially on an inner surface of the valve housing channel.

6. The one-way valve according to claim 1, wherein an outer surface of the valve body includes a tapered surface with a diameter gradually decreasing from the second end portion of the valve body toward the first end portion of the valve body.

7. The one-way valve according to claim 1, wherein an outer surface of the valve housing or of the valve body includes a grip portion, which comprises at least partially a flat face.

8. The one-way valve according to claim 1, wherein the valve housing is a gravity ring made of metal or plastic material, and the sealing plug is made of rubber.

9. The one-way valve according to claim 1, wherein an anti-falling portion is provided at the first end portion of the valve body to prevent the sealing plug from disengaging from the one-way valve, and the sealing plug can move, within the valve body channel, out of the second end portion of the valve body and into the valve housing channel.

10. A tire repair glue bottle, comprising:
    a bottle body containing glue;
    an air intake device attached to the bottle body;
    a bottle lid attached to the bottle body;

a glue tube located within the bottle body and having one end connected to the bottle lid; and a one-way valve including:
- a valve housing having a first end portion, a second end portion, a valve housing channel, and a stopper projection provided within the valve housing channel,
- a valve body having a first end portion, a second end portion, and a valve body channel in fluid communication with the valve housing channel, the second end portion of the valve body being snap-fit to the first end portion of the valve housing,
- a sealing plug slidably disposed within the valve body channel, and
- a step provided on an inner surface of the valve body channel, wherein an inner diameter of the valve housing channel is greater than an inner diameter of the valve body channel and an outer diameter of the sealing plug, and a distance between the stopper projection and the second end portion of the valve body is greater than a longitudinal length of the sealing plug, wherein the plug is configured to pass the step when a pressure reaches a predetermined value, and wherein the second end portion of the valve housing of the one-way valve is connected to the other end of the glue tube.

11. The tire repair glue bottle according to claim 10, wherein the valve housing of the one-way valve comprises a mouthpiece projecting outwardly from the second end portion thereof, which is connected to the glue tube by means of a spring tube clamp.

12. The tire repair glue bottle according to claim 10, wherein a plurality of mating recesses are provided on an inner surface of the valve housing channel, and mating projections corresponding to one or more of the plurality of mating recesses are provided on an outer surface of the second end portion of the valve body.

13. The tire repair glue bottle according to claim 12, wherein an insertion guide slot extending from an end surface of the first end portion of the valve housing to the plurality of mating recesses is provided on the inner surface of the valve housing channel.

14. The tire repair glue bottle according to claim 10, wherein the stopper projection is an annular projection projecting from the second end portion of the valve housing into the valve housing channel along an axial direction of the valve housing, which includes an opening penetrating a circumferential surface thereof.

15. The tire repair glue bottle according to claim 10, wherein the stopper projection is configured to project radially on an inner surface of the valve housing channel.

16. The tire repair glue bottle according to claim 10, wherein an outer surface of the valve body includes a tapered surface with a diameter gradually decreasing from the second end portion of the valve body toward the first end portion of the valve body.

17. The tire repair glue bottle according to claim 10, wherein an outer surface of the valve housing or of the valve body includes a grip portion, which comprises at least partially a flat face.

18. The tire repair glue bottle according to claim 10, wherein the valve housing is a gravity ring made of metal or plastic material, and the sealing plug is made of rubber.

19. The tire repair glue bottle according to claim 10, wherein an anti-falling portion is provided at the first end portion of the valve body to prevent the sealing plug from disengaging from the one-way valve, and the sealing plug can move, within the valve body channel, out of the second end portion of the valve body and into the valve housing channel.

* * * * *